United States Patent
Dubois et al.

(10) Patent No.: US 9,214,694 B2
(45) Date of Patent: Dec. 15, 2015

(54) ASSEMBLY FOR REVERSIBLE FUEL CELL

(75) Inventors: Eric Dubois, Wasseiges (BE); Hugo Vandenborre, Kasterlee (BE)

(73) Assignee: SOLVAY SA, Brussels (BE)

( * ) Notice: Subject to any disclaimer, the term of this patent is extended or adjusted under 35 U.S.C. 154(b) by 332 days.

(21) Appl. No.: 13/818,769

(22) PCT Filed: Aug. 23, 2011

(86) PCT No.: PCT/EP2011/064429
§ 371 (c)(1),
(2), (4) Date: Feb. 25, 2013

(87) PCT Pub. No.: WO2012/028491
PCT Pub. Date: Mar. 8, 2012

(65) Prior Publication Data
US 2013/0146471 A1    Jun. 13, 2013

(30) Foreign Application Priority Data
Aug. 30, 2010   (EP) .................................... 10174543

(51) Int. Cl.
*H01M 8/02*   (2006.01)
*H01M 8/18*   (2006.01)
(Continued)

(52) U.S. Cl.
CPC ............... *H01M 8/186* (2013.01); *C25B 9/10* (2013.01); *H01M 4/8605* (2013.01); *H01M 8/023* (2013.01); *H01M 8/1018* (2013.01); *Y02E 60/521* (2013.01); *Y02E 60/528* (2013.01)

(58) Field of Classification Search
CPC ................... H01M 2008/1095; H01M 8/1004; H01M 4/8807; H01M 4/881
See application file for complete search history.

(56) References Cited

U.S. PATENT DOCUMENTS

| | | |
|---|---|---|
| 3,807,918 A | 4/1974 | Chill et al. |
| 4,849,311 A | 7/1989 | Itoh et al. |

(Continued)

FOREIGN PATENT DOCUMENTS

| | | |
|---|---|---|
| EP | 1167400 A1 | 1/2002 |
| EP | 1179548 A1 | 2/2002 |

(Continued)

OTHER PUBLICATIONS

Altmann, S., et al—"Development of Bifunctional Electrodes for Closed-loop Fuel Cell Applications", 2009, ECS Transactions, vol. 25, Issue No. 1, [DOI: 10.1149/1.3210688], The Electrochemical Society, pp. 1325-1333; 9 pgs.

(Continued)

*Primary Examiner* — Stewart Fraser
*Assistant Examiner* — Olatunji Godo

(57) ABSTRACT

A membrane-electrode assembly for use in a reversible fuel cell comprises an ion conductive membrane having first and second surfaces; a first electrocatalyst layer in contact with the first surface of the membrane, such first electrocatalyst layer comprising at least one discrete electrolysis-active area ($ELE1_i$) and at least one discrete energy generation-active area ($EG1_i$). A second electrocatalyst layer is placed in contact with the second surface of the membrane, such second electrocatalyst layer comprising at least one discrete electrolysis-active area ($ELE2_i$) and at least one discrete energy generation-active area ($EG2_i$). Each of the discrete electrolysis-active area(s) ($ELE1_i$) on the first electrocatalyst layer correspond and are aligned with each of the discrete electrolysis-active area(s) ($ELE2_i$) on the second electrocatalyst layer, and each of the discrete energy generation-active area(s) ($EG1_i$) on the first electrocatalyst layer correspond and are aligned with each of the discrete energy generation-active area(s) ($EG2_i$) on the second electrocatalyst layer.

18 Claims, 3 Drawing Sheets

(51) Int. Cl.
*C25B 9/10* (2006.01)
*H01M 4/86* (2006.01)
*H01M 8/10* (2006.01)

(56) References Cited

U.S. PATENT DOCUMENTS

| | | | |
|---|---|---|---|
| 5,635,041 A | 6/1997 | Bahar et al. | |
| 5,733,430 A * | 3/1998 | Ashida et al. | 205/337 |
| 5,945,232 A | 8/1999 | Ernst et al. | |
| 2002/0172844 A1 | 11/2002 | Ito et al. | |
| 2003/0068544 A1 | 4/2003 | Cisar et al. | |
| 2005/0211569 A1* | 9/2005 | Botte et al. | 205/687 |
| 2005/0250004 A1 | 11/2005 | McLean et al. | |
| 2007/0105008 A1* | 5/2007 | Gu et al. | 429/44 |
| 2009/0130527 A1* | 5/2009 | McLean et al. | 429/33 |

FOREIGN PATENT DOCUMENTS

| | | |
|---|---|---|
| EP | 1323744 A1 | 7/2003 |
| EP | 1589062 A2 | 10/2005 |
| EP | 1702670 A1 | 9/2006 |
| EP | 1702688 A1 | 9/2006 |
| FR | 2854278 A1 | 10/2004 |
| FR | 2937478 A1 | 4/2010 |

OTHER PUBLICATIONS

Ann, J., et al—"Bifunctional electrodes for an integrated water-electrolysis and hydrogen-oxygen fuel cell with a solid polymer electrolyte", 1992, Journal of Applied Electrochemistry, vol. 22, Issue No. 12, Chapman & Hall, pp. 1167-1174; 8 pgs.

* cited by examiner

US 9,214,694 B2

ASSEMBLY FOR REVERSIBLE FUEL CELL

CROSS REFERENCE TO RELATED APPLICATIONS

This application is a U.S. national stage entry under 35 U.S.C. §371 of International Application No. PCT/EP2011/064429 filed Aug. 23, 2011, which claims priority to European application No. 10174543.8 filed on Aug. 30, 2010, the whole content of this application being incorporated herein by reference for all purposes.

TECHNICAL FIELD

The present invention is generally directed to fuel cells and more specifically to reversible fuel cells and their components.

BACKGROUND ART

Fuel cells are electrochemical devices which can convert energy stored in fuels to electrical energy with high efficiencies by oxidation of a fuel and reduction of an oxidizing agent. The fuel and the oxidizing agent, undergo a redox reaction at two isolated electrodes, each containing a catalyst in contact with an electrolyte. The electrolyte is located between the electrodes to prevent direct reaction of the two reactants and to conduct ions from one side of the cell to the other. Advantageously the electrolyte can be a solid polymer electrolyte.

A broad range of reactants can be used in fuel cells. For example, the fuel may be substantially pure hydrogen gas, a gaseous hydrogen-containing reformate stream, or methanol in a direct methanol fuel cell. The oxidant may be, for example, substantially pure oxygen or a dilute oxygen stream such as air.

On the other hand, an electrolyzer uses electricity to produce different chemical species, e.g. hydrogen and oxygen from water or chlorine, sodium hydroxide and hydrogen from an alkaline brine. An electrolyzer basically involves a fuel cell operating in reverse.

Fuel cells that allow reversed operation, such that oxidized fuel can be reduced back to unoxidized fuel using electrical energy as an input, are generally referred to as "reversible" or "regenerative" fuel cells. The ability to generate electricity and regenerate fuel makes reversible fuel cells particularly attractive for electrical energy storage.

Of particular interest are the so-called unitized regenerative fuel cells, that is reversible fuel cells wherein both the energy generation mode of operation (the fuel cell mode) and the electrolysis mode of operation are carried out within the same cell stack. Because the electroactive components of such a cell must operate in both electrolysis and fuel cell modes, it is difficult to optimize them for both.

As an example U.S. 2003/0068544 A (CISAR, A.) Oct. 4, 2003 discloses an unitized regenerative hydrogen-oxygen fuel cell wherein the oxygen electrode comprises an electrocatalyst layer containing a mixture of a catalyst active for the evolution of oxygen from water and of a catalyst active for the reduction of oxygen to water. The gas diffusion layer for the oxygen electrode comprises hydrophobic and hydrophilic regions. With such a configuration however the transport of water to and from the differently active electrocatalytic areas of the electrode does not appear to be optimal.

Thus, the need still exists for unitized regenerative fuel cells capable to operate with the highest efficiency both in the fuel cell mode and in the electrolysis mode.

SUMMARY OF INVENTION

A first objective of the present invention is an assembly for use in a reversible fuel cell, in particular in an unitized regenerative fuel cell provided with optimised activity both when the cell is operated in the electrolysis mode and in the energy generation mode. An additional objective of the present invention is a reversible fuel cell comprising the assembly.

DESCRIPTION OF INVENTION

First object of the present invention is a membrane-electrode assembly for a reversible fuel cell. The expression "membrane electrode assembly" is used herein to refer to an assembly which comprises an ion conductive membrane disposed between two electrocatalyst layers, each comprising an appropriate catalyst for facilitating the desired electrochemical reaction, located adjacent the ion conductive membrane.

Figure 1:
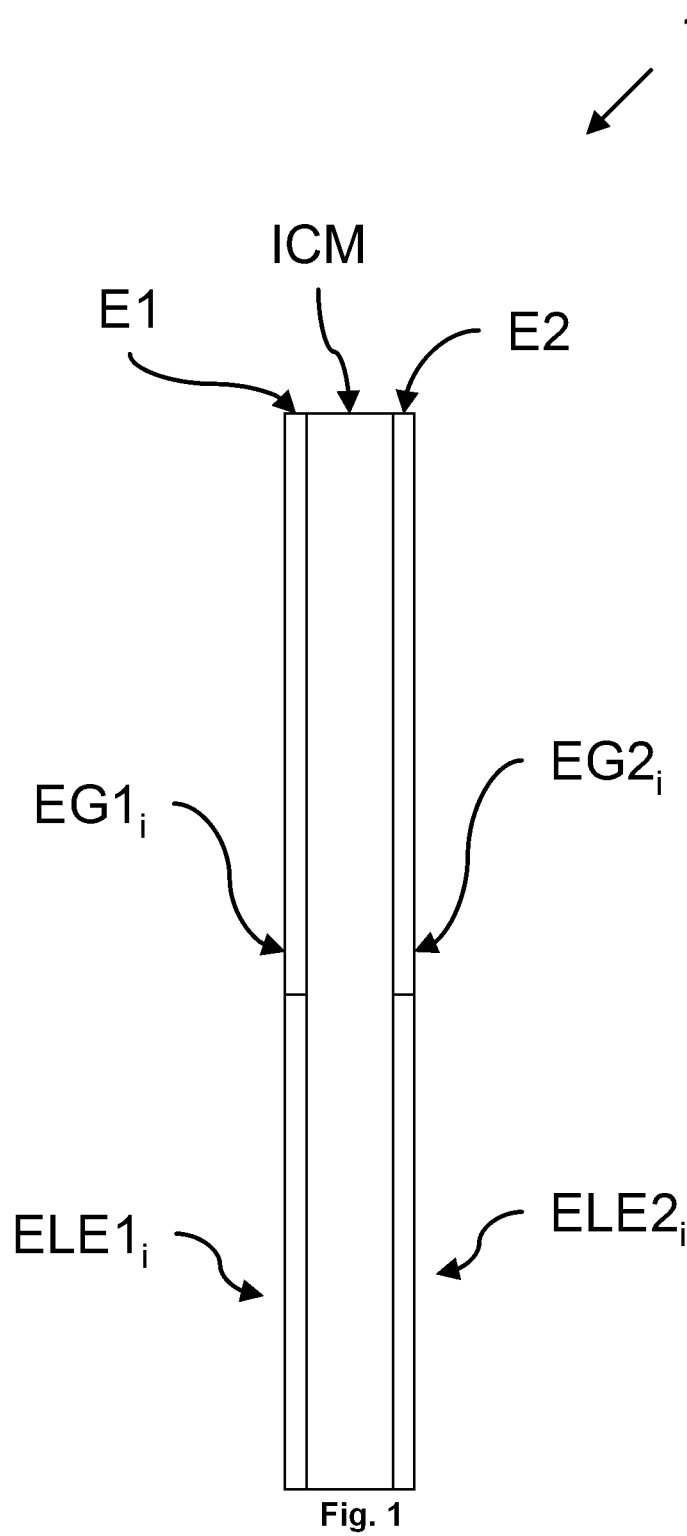
FIG. 1 is a schematic cross-section of a membrane-electrode assembly of the invention.

With reference to FIG. 1, the assembly of the invention (1) comprises an ion conductive membrane ICM having a first and a second surface. A first electrocatalyst layer E1 is in contact with the first surface of the membrane and a second electrocatalyst layer E2 is in contact with the second surface of the membrane.

First electrocatalyst layer E1 comprises at least one discrete electrolysis-active area ($ELE1_j$) and at least one discrete energy generation-active area ($EG1_j$). Second electrocatalyst layer comprises at least one discrete electrolysis-active area ($ELE2_i$) and at least one discrete energy generation-active area ($EG2_i$). Each one of the discrete electrolysis-active area(s) $ELE1_i$ on first electrocatalyst layer E1 corresponds and is aligned with each one of the discrete electrolysis-active area(s) $ELE2_i$ on second electrocatalyst layer E2. Each one of the discrete energy generation-active area(s) $EG1_i$ on first electrocatalyst layer E1 corresponds and is aligned with each one of the discrete energy generation-active area(s) $EG2_i$ on second electrocatalyst layer E2.

The expression "corresponds and is aligned with" referred to a discrete area on any element of the assembly of the invention is used herein to indicate that the area has the same size and shape and is aligned with a corresponding area on the surface of the ion conductive membrane or with a corresponding area on the surface of the equivalent element on the opposite side of the ion conductive membrane.

Figure 2:
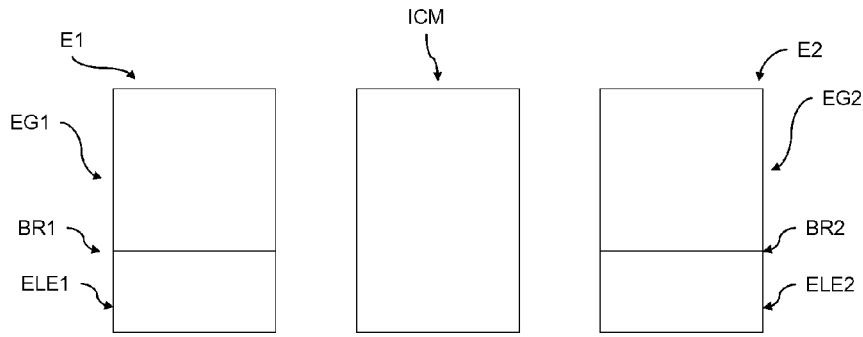
FIGS. 2 and 3 are schematic views of the components of a membrane-electrode assembly according to a first and to a second embodiment of the invention.

FIG. 2 shows an embodiment of the assembly (1) of the invention comprising the ion conductive membrane (ICM) and first and second electrocatalyst layers E1 and E2. In the embodiment shown in FIG. 2 each electrocatalyst layer comprises one discrete electrolysis-active area (ELE1 and ELE2) and one energy generation-active area (EG1 and EG2).

Each electrocatalyst layer (E1 and E2) may comprise more than one electrolysis-active area $ELE_i$ and more than one energy generation-active area $EG_i$.

Each electrolysis-active area on the first electrocatalyst layer $ELE1_i$ corresponds and is aligned with each electrolysis-active area $ELE2_i$ on second electrocatalyst layer E2, and each energy generation-active area $EG1_i$ corresponds and is aligned with each energy generation-active area $EG2_i$.

The total electrolysis-active area on E1 ($\Sigma\, ELE1_i$) equals the total electrolysis-active area on E2 ($\Sigma\, ELE2_i$) and the total energy generation-active area on E1 ($\Sigma\, EG1_i$) equals the total energy generation-active area on E2 ($\Sigma\, EG2_i$). Thus: $\Sigma\, ELE1_i = \Sigma\, ELE2_i$ and $\Sigma\, EG1_i = \Sigma\, EG2_i$.

There is no limitation on the number, size and shape of the areas of each type $EG_i$ and $ELE_i$ in the assembly of the invention provided they form discrete, individually distinct areas. In general the size of each area will depend on the size of the assembly although, typically, areas $EG_i$ and $ELE_i$ will have a surface of at least $0.01\ mm^2$, even of at least $0.1\ mm^2$, possibly even greater than $0.5\ mm^2$.

The number i of each type of area will typically range from 1 to 100, preferably from 1 to 50, more preferably from 1 to 20. The areas may have any shape, although regular shapes may be preferred.

The sum of all of the discrete electrolysis-active areas $\Sigma\, ELE1_i$ (or $\Sigma\, ELE2_i$), which corresponds to the extension of electrolysis-active area ELE1 when i=1, may be the same or different than the sum of all of the discrete energy generation-active areas on each of the electrocatalyst layers $\Sigma\, EG1_i$ (or $\Sigma\, EG2_i$).

In the case of an assembly for use in a hydrogen/oxygen fuel cell typically $\Sigma\, EG1_i$ is greater than $\Sigma\, ELE1_i$ and consequently $\Sigma\, EG2_i$ is greater than $\Sigma\, ELE2_i$. Preferably the ratio $\Sigma\, EG_i/\Sigma\, ELE_i$ ranges from 1.5:1 to 5:1, more preferably from 2:1 to 4.5:1, even more preferably from 2.5:1 to 4:1. An even more preferred ratio may be from 2.8:1 to 3.5:1.

In other types of reversible fuel cells the ratio between the energy generation-active areas and the electrolysis-active areas on each electrocatalyst layers may be different and will typically depend on the voltage generated by the reactions in the two modes of operation of the cell.

Each discrete electrolysis-active area $ELE_i$ is separated from each energy generation-active area $EG_i$ by at least one boundary region $BR_j$. The number of boundary regions j will depend on the number of energy generation-active areas and electrolysis-active areas as well as on their arrangement on the electrocatalyst layers. The boundary region may be a simple discontinuity in the electrocatalyst layer deriving from the change in composition or morphology between the electrolysis-active area(s) and the adjacent energy generation-active area(s).

Alternatively, the boundary region BR may be a discrete region characterised by a composition different from the composition of any of the adjacent areas $ELE_i$ and $EG_i$. The boundary region $BR_j$ may advantageously have a different composition than each of the adjacent areas $ELE_i$ and $EG_i$. The boundary region may be characterized by a different electrical conductivity than the adjacent areas, e.g. no or negligible electrical conductivity.

Among the systems that may be used in reversible fuel cells the most environmentally attractive is the hydrogen/oxygen/water system. This system uses the electrochemical reaction of hydrogen and oxygen to produce water when operating in the energy generation mode (or fuel cell mode). Hydrogen and oxygen can be regenerated by the electrolysis of water when the cell operates in the electrolysis mode.

Hydrogen/oxygen fuel cells may operate both in an acidic environment, using an hydrogen ion conductive membrane, and in an alkaline environment, using an hydroxyl ion conductive membrane.

The components of the inventive assembly will be described in detail with reference to hydrogen/oxygen fuel cells although it is well understood that the assembly of the invention is by no means limited to the use in hydrogen/oxygen based reversible fuel cells.

First Electrocatalyst Layer E1

First electrocatalyst layer E1 is in contact with the first surface of the ion conductive membrane ICM. First electrocatalyst layer E1 comprises discrete electrolysis-active area(s) $ELE1_i$ and discrete energy generation-active area(s) $EG1_i$. Each discrete electrolysis-active area $ELE1_i$ is separated from each energy generation-active area $EG1_i$ by at least one boundary region $BR1_j$.

Without being limited by this selection and for the sake of description first electrocatalyst layer will be hereinafter described as the oxygen electrode in a hydrogen/oxygen fuel cell. When the cell operates in the fuel-cell mode, oxygen will be reduced at the energy generation-active area(s) $EG1_i$ producing water. When the cell operates in the electrolysis mode water will be oxidised at the electrolysis-active area(s) $ELE1_i$ producing oxygen.

In general known highly active catalysts for oxygen reduction are poor catalysts for water oxidation and oxygen evolution. Accordingly, the catalyst used in the energy generation-active area(s) $EG1_i$ will typically be different from the catalyst used in the electrolysis-active area(s) $ELE1_i$ of the oxygen electrode. The choice of catalysts will also be different depending on the operating environment of the cell, whether acidic or alkaline.

When the cell is operated in an acidic environment, a suitable catalyst for the energy generation-active area(s) $EG1_i$ can be selected from metals such as platinum, palladium, rhodium and alloys thereof. The catalytically active metals or metal alloys can also contain other elements such as ruthenium, cobalt, chromium, tungsten, molybdenum, vanadium, iron, copper, nickel. The metals may be unsupported or supported on suitable electrically conductive particles. Carbon blacks, graphite or active charcoal may advantageously be used as supports. A preferred catalyst for the energy generation-active area(s) $EG1_i$ is platinum supported on carbon black.

Suitable catalysts for the electrolysis-active area(s) $ELE1_i$ are mixed metal or mixed metal oxides, comprising for instance ruthenium and iridum oxides or iridium and titanium oxides, optionally supported on carbon black or any other suitable support as discussed above.

When the cell is operated in an alkaline environment, a suitable catalyst for the energy generation-active area(s) $EG1_i$ is for instance silver, both supported and unsupported. A suitable catalyst for the electrolysis-active area(s) $ELE1_i$ is selected from supported or unsupported nickel. Suitable supports are as discussed above.

Typically the electrocatalyst layer comprises a binder in addition to the catalyst. The binder may be selected among perfluorinated ionically conductive polymers which are also suitable for the preparation of ion conductive membranes.

In an embodiment of the assembly of the invention, areas $EG1_i$ and $ELE1_i$ on first electrocatalytic layer E1 may additionally differ in their water affinity characteristics. To improve the presence of water at the surface of electrolysis-active area(s) $ELE1_i$, where water is oxidised producing oxygen, a hydrophilic surface may be preferred. On the other hand energy generation-active area(s) $EG1_i$ are preferably hydrophobic, to facilitate the removal of water which is produced by the reduction of oxygen taking place at the electrocatalyst layer. The different properties could be obtained for instance by using different binders in the preparation of each discrete area on the electrocatalyst layer.

Second Electrocatalyst Layer E2

Second electrocatalyst layer E2 is in contact with the second surface of the ion conductive membrane ICM. Second electrocatalyst layer E2 comprises discrete electrolysis-active area(s) $ELE2_i$ and discrete energy generation-active area(s) $EG2_j$. Each discrete electrolysis-active area $ELE2_i$ is separated from each energy generation-active area $EG2_i$ by at least one boundary region $BR2_j$.

Second electrocatalyst layer will be hereinafter described as the hydrogen electrode of a hydrogen/oxygen fuel cell. Thus, when the cell is operating in the fuel-cell mode hydrogen will be oxidised at the energy generation-active area(s) $EG2_i$ producing hydrogen ions. When the cell is operating in the electrolysis mode hydrogen ions will be reduced at the electrolysis-active area(s) $ELE2_i$ producing hydrogen.

Suitable catalysts for the energy generation-active area(s) $EG2_i$ in a hydrogen/oxygen fuel cell operating in an acidic environment are for instance platinum or equimolar mixtures of rhodium and ruthenium oxides. Said catalysts may be unsupported or supported as described above. Additionally, to facilitate the access of hydrogen to the energy generation-active area(s) $EG2_i$ said areas may be provided with high permeability to gases. A suitable catalyst for the electrolysis-active area(s) $ELE2_i$ is platinum supported on carbon black.

When the hydrogen/oxygen fuel cell operates in an alkaline environment a suitable catalyst for both the energy generation-active area(s) $EG2_i$ and the electrolysis-active area(s) $ELE2_i$ is nickel, unsupported or supported as described above.

Areas $EG2_i$ and $ELE2_i$ on second electrocatalytic layer E2 may additionally differ in other properties, such as their water affinity characteristics or their gas transmission properties as mentioned above. These different properties could be obtained for instance by using different binders or additives in the preparation of the different areas of the electrocatalytic layer.

The Ion Conductive Membrane

The role of the electrolyte in an electrochemical cell is to advantageously allow the passage of ions from one side of the cell to the other to maintain the neutral balance on each side of the cell without allowing the direct reaction of the active species. The electrolyte, or preferably the ion conductive membrane, may be either cationic or anionic in nature.

In a first design of a hydrogen/oxygen fuel cell, operating in an acidic environment, the ion conductive membrane has to allow hydrogen ions to pass through it while at the same creating a barrier towards the permeation of hydrogen and oxygen from one side of the cell to the other. Thus, in such a cell the electrolyte is anionic in nature.

In a second design of a hydrogen/oxygen fuel cell, operating in an alkaline environment, the ion conductive membrane has to allow hydroxyl ions to pass through it while at the same creating a barrier towards the reactants. Thus, in such a cell the electrolyte is cationic in nature.

Typically the ion conductive membrane comprises an ion conductive polymeric material, although ion conductive membranes made of liquids or gels could also be used in the assembly of the invention.

Any suitable ion conductive polymeric material may be used in the assembly of the present invention. In general, perfluorinated polymers comprising ionic groups are preferably used as ion conductive materials in fuel cells due to their chemical and thermal resistance.

Anionic polymeric materials are generally selected among the copolymers of tetrafluoroethylene and one or more fluorinated monomers comprising an ion exchange group, such as sulfonic acid, carboxylic acid, phosphoric acid groups. More generally anionic polymeric materials may be selected among the copolymers of tetrafluoroethylene and one or more fluorinated monomers comprising a precursor group for sulfonic acid, such as $F_2C=CF—O—CF_2—CF_2—SO_2F$; $F_2C=CF—O—[CF_2—CXF—O]_n-CF_2—CF_2—SO_2F$ wherein $X=Cl$, F or $CF_3$ and $n=1-10$; $F_2C=CF—O—CF_2—CF_2—CF_2—SO_2F$; $F_2C=CF—O—CF_2—CF_2—CF_2—CF_2—SO_2F$; $F_2C=CF—Ar—SO_2F$ wherein Ar is an aryl ring. Suitable materials are for instance those marketed by E.I. DuPont under the trade name Nafion®, those marketed by Solvay Solexis under the trade name Aquivion® or those marketed by Asahi Glass Co. under the trade name Flemion®. Fluorine-free, ion conductive polymeric materials such as sulfonated polyether ketones or aryl ketones or acid-doped polybenzimidazoles could also be used.

Cationic polymeric materials are generally selected from polymers, preferably fluorinated polymers, comprising amino or acrylic acid ion exchange groups.

The ion conductive polymeric material typically has an equivalent weight of no more than 1700 g/eq, more typically of no more than 1500 g/eq, more typically of no more than 1200 g/eq, and most typically of no more than 1000 g/eq. The ion conductive polymeric material typically has an equivalent weight of at least 380 g/eq, preferably at of least 500 g/eq, more preferably of at least 600 g/eq.

EP-A-1323744, EP-A-1179548, EP-A-1167400, EP-A-1589062, EP-A-1702670, EP-A-1702688 disclose suitable ion conductive polymer materials and ion conductive membranes for use in the assembly of the invention.

The ion conductive membrane may consist of the polymer electrolyte or it may comprise the polymer electrolyte impregnated or coated on a suitable porous support. For instance, U.S. Pat. No. 5,635,041 describes an impregnated membrane comprising an expanded polytetrafluoroethylene support. Impregnated membranes are also described in U.S. Pat. No. 4,849,311.

In a first embodiment of the inventive assembly the ion conductive membrane has the same composition throughout its extension.

In a second embodiment the ion conductive membrane is divided in discrete areas, typically corresponding and aligned with each of the electrolysis-active area couples ($ELE1_i$ and $ELE2_i$) and each of the energy generation-active area couples ($EG1_i$ and $EG2_i$) on electrocatalyst layers E1 and E2 on the first and second surfaces of the ion conductive membrane. The areas may have the same or different composition.

Figure 3:
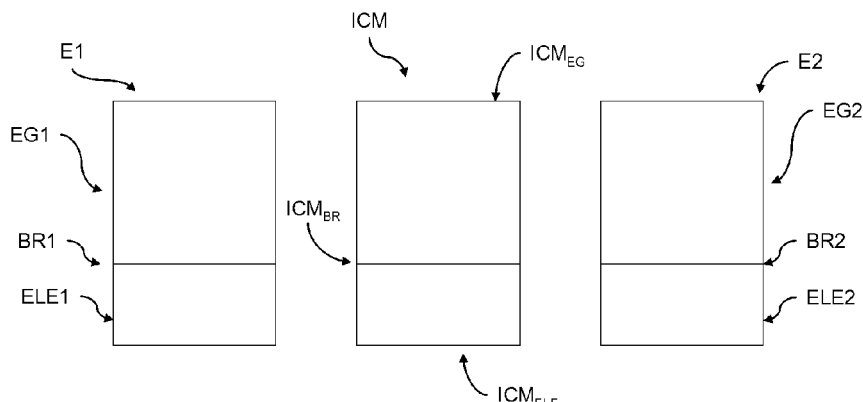

With reference to FIG. 3 the area of the ion conductive membrane in contact with the electrolysis-active areas on electrocatalyst layers E1 and E2 is indicated as $ICM_{ELE}$ whereas the area of the ion conductive membrane in contact with the energy generation-active areas on electrocatalyst layers E1 and E2 is indicated as $ICM_{EG}$. It is understood that the number of areas $ICM_{ELE}$ and $ICM_{EG}$ on the ion conductive membrane will correspond to the number of electrolysis-active areas and energy generation-active areas in the electrcatalyst layers E1 and E2.

For instance ion conductive polymeric materials with different equivalent weights could be used in the electrolysis-active areas and energy generation-active areas $ICM_{ELEi}$ and $ICM_{EGi}$ of the ion conductive membrane.

In a further embodiment each electrolysis-active area $ICM_{ELEi}$ is separated from each energy generation-active area $ICM_{EGi}$ by a boundary region $ICM_{BRj}$ which will typically correspond to the boundary region between each electrolysis-active area and each energy generation-active area on the electrocatalyst layers ($BR1_j$ and $BR2_j$, respectively).

Boundary region(s) $ICM_{BRj}$ may be a simple discontinuity in the ion conductive membrane deriving from the change in composition or morphology between the electrolysis-active area(s) and the adjacent generation-active area(s). Alternatively, the boundary region $ICM_{BRj}$ may be a discrete region characterised by a composition different from the composition of any of the adjacent areas $ICM_{ELEi}$ and $ICM_{EGi}$.

The boundary region $ICM_{BRj}$ may advantageously have a different composition than each of the areas $ICM_{ELEi}$ and $ICM_{EGi}$. The boundary region may be characterized by a different ionic conductivity than the adjacent areas, e.g. no or negligible ionic conductivity. Alternatively the boundary region may have different water affinity properties than the adjacent areas. Still alternatively the boundary region may have different gas transmission properties. For instance, boundary region(s) $ICM_{BRj}$ could be characterized by lower ionic conductivity and lower water adsorption properties than each of the adjacent areas $ICM_{ELEi}$ and $ICM_{EGi}$.

Gas Diffusion Layers

In a typical fuel cell design gas diffusion layers are placed in contact with each electrocatalyst layer, to bring gaseous reactants (e.g. oxygen and hydrogen) to the electrocatalyst layers and at the same time to create an electrical contact with the remaining components of the fuel cell, e.g bipolar plates. The gas diffusion layers are typically porous to allow the passage of gaseous reactants and they include electrically conductive particles to impart electrical conductivity.

The assembly of the invention may further comprise a first gas diffusion layer GDL1 in contact with the surface of electrocatalyst layer E1 not in contact with the ion conductive membrane and a second gas diffusion layer GDL2 in contact with the surface of electrocatalyst layer E2 not in contact with the ion conductive membrane.

Gas diffusion layers GDL1 and GDL2 may have the same composition and structure or they may be different.

In an embodiment of the invention gas diffusion layer GDL1 in contact with electrocatalyst layer E1 is divided in discrete areas, typically corresponding in size and aligned with each of the electrolysis-active areas ($GDL1_{ELEi}$) and each of the energy generation-active areas ($GDL1_{EGi}$) on the first electrocatalyst layer E1.

Figure 4:
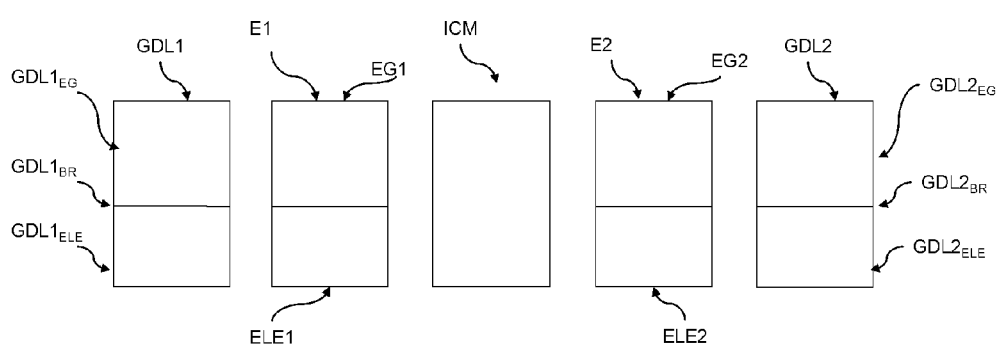
FIG. 4 is a schematic view of the components of an assembly comprising a membrane-electrode assembly and gas diffusion layers according to a further embodiment of the invention.

With reference to FIG. 4 the area of the gas diffusion layer in contact with the electrolysis-active area on each of the electrocatalyst layers is indicated as $GDL_{ELE}$ whereas the area of the gas diffusion layer in contact with the energy generation-active areas on each of the electrocatalyst layers is indicated as $GDL_{EG}$. It is understood that, when present, the number of areas $GDL_{ELE}$ and $GDL_{EG}$ on the gas diffusion layers will correspond to the number of electrolysis-active areas and energy generation-active areas on the electroactive layers.

Each electrolysis-active area $GDL_{ELEi}$ is separated from each energy generation-active area $GDL_{EGi}$ by a boundary region $GDL_{BRj}$ which will typically correspond to the boundary region between each electrolysis-active area and each energy generation-active area on each of the electroactive layers ($BR1_j$ and $BR2_j$, respectively).

Boundary region(s) $GDL_{BRj}$ may be a simple discontinuity in the gas diffusion layer deriving from the change in composition or morphology between the electrolysis-active area(s) and the adjacent generation-active area(s). Alternatively, the boundary region $GDL_{BRj}$ may be a discrete region characterised by a composition different from the composition of any of the adjacent areas $GDL_{ELEi}$ and $GDL_{EGi}$.

The boundary region $GDL_{BRj}$ may advantageously have a different composition than each of the areas $GDL_{ELEi}$ and $GDL_{EGi}$. The boundary region may be characterized by a different electrical conductivity than the adjacent areas, e.g. no or negligible electrical conductivity. Alternatively the boundary region may have different water affinity properties than the adjacent areas. Still alternatively the boundary region may have different gas transmission properties. For instance, boundary region(s) $GDL_{BRj}$ could be characterized by no or negligible electrical conductivity than each of the adjacent areas $GDL_{ELEi}$ and $GDL_{EGi}$.

In the specific embodiment shown in FIG. 4, gas diffusion layer GDL1 comprises an electrolysis-active area $GDL1_{ELE}$ and an energy generation-active area $GDL1_{EG}$, separated by a boundary region $GDL1_{BR}$.

To improve to delivery of water to electrolysis-active area ELE1 area $GDL1_{ELE}$ is preferably hydrophilic. Energy generation-active area on the gas diffusion layer $GDL1_{EG}$ may advantageously be hydrophobic.

Similarly, gas diffusion layer GDL2 comprises an electrolysis-active area $GDL2_{ELE}$ and an energy generation-active area $GDL2_{EG}$, separated by a boundary region $GDL2_{BR}$. Areas $GDL2_{ELE}$ and $GDL2_{EG}$ may have the same or different composition and/or properties. Electrolysis-active area $GDL2_{ELE}$ may be hydrophilic and energy generation-active area on the gas diffusion layer $GDL2_{EG}$ may advantageously be hydrophobic.

Typically $GDL2_{EG}$ will be provided with higher gas transport properties than $GDL2_{ELE}$ to allow the flow of hydrogen towards the surface of the energy generation-active area EG2.

Preparation of the Assembly

The electrocatalyst layers E1 and E2 can be applied to the ion conductive membrane or the gas diffusion layers GDL1 and GDL2 by various conventional methods.

Electrocatalyst layers E1 and E2 could be applied to the first and second surfaces of the ion conductive membrane by standard coating or printing techniques, using different compositions for each of the electrolysis-active areas $ELE_i$ and each of the energy generation-active areas $EG_i$.

Alternatively, each electrocatalyst layer E1 and E2 could be applied, using different compositions for each of the electrolysis-active areas $ELE_i$ and each of the energy generation-active areas $EG_i$, first to the surface of the corresponding gas diffusion layer (GDL1 or GDL2) and then placed in contact with the first or second surface of the ion conductive membrane using known hot pressing or lamination techniques.

Several methods could be used to fabricate ion conductive membranes having discrete electrolysis-active areas and energy generation-active areas $ICM_{ELE}$ and $ICM_{EG}$. For instance in the case of membranes comprising an ion conductive polymer impregnated onto a porous support, different ion conductive polymer solutions or dispersions could be used to impregnate different areas of the porous support.

Alternatively, when the ion conductive membrane is made of an extruded film of the ion conductive polymer, parallel discrete electrolysis-active areas and energy generation-active areas could be directly obtained by extruding different types of ion conductive polymers through appropriate extrusion dies, such as those described in U.S. Pat. No. 3,807,918.

Gas diffusion layers comprising discrete electrolysis-active areas and energy generation-active areas could be obtained, for example, by bonding alternating strips of hydrophobic and hydrophilic gas diffusion material to an electrocatalyst coated membrane to produce a striped pattern. Alternating bands of gas diffusion materials having different properties could be deposited onto a common substrate.

Alternatively, sub-assemblies comprising all of the energy generation-active portions of the assembly, that is EG1/ICM$_{EG}$/EG2 or optionally GDL1$_{EG}$/EG1/ICM$_{EG}$/EG2/GDL2$_{EG}$, and all of the electrolysis-active portions of the assembly, that is ELE1/ICM$_{ELE}$/ELE1 or GDL1$_{ELE}$/ELE1/ICM$_{ELE}$/ELE2/GDL2$_{ELE}$, could be manufactured separately and then assembled together by means of suitable adhesives or gaskets.

Figure 5:
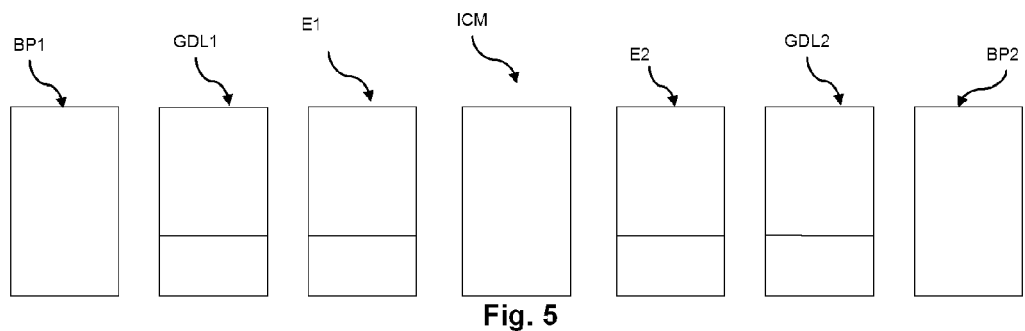
FIG. 5 is a schematic view of the components of a fuel cell stack comprising a membrane-electrode assembly, gas diffusion layers and bipolar plates according to an additional embodiment of the invention.

The assembly of the invention, comprising membrane-electrode assembly (1) sandwiched between gas diffusion layers GDL1 and GDL2 may further comprise a first and a second bipolar plate (BP1 and BP2) positioned on each side and in contact with first and second gas diffusion layers, respectively, as shown in FIG. 5.

Bipolar plates are suitably shaped sheets made of electrically conductive materials impervious to the cell reactants, such as graphite or metals. Bipolar plates are typically provided with grooves and/or channels for distributing reactants to the electrocatalyst layers.

First and second bipolar plates may each comprise at least one discrete electrolysis-active area (BP$_{ELEi}$) and at least one discrete energy generation-active area (BP$_{EGi}$), each of them corresponding in size and aligned with each of the electrolysis-active areas (GDL$_{ELEi}$) and each of the energy generation-active areas (GDL$_{EGi}$) on the first and second gas diffusion layers.

An assembly comprising a membrane-electrode assembly, gas diffusion layers and bipolar plates is typically referred to as a fuel cell stack. Preferably the fuel cell stack of the invention is a single block.

Additional elements, such as gasket, seals and the like, may be present in the assembly or stack of the invention as conventionally known in the art.

The assembly of the invention is suitable for use in a reversible fuel cell.

The assemblies of the invention have been described with reference to the drawings as a planar assembly, however other configurations are possible and within the scope of the present claims, in particular a configuration wherein the discrete energy generation-active and electrolysis-active portions of the assembly would be arranged around the circumference of a cylindrically shaped assembly.

Should the disclosure of any patents, patent applications, and publications which are incorporated herein by reference conflict with the description of the present application to the extent that it may render a term unclear, the present description shall take precedence.

The invention claimed is:

1. An assembly for an electrochemical cell, comprising:
an ion conductive membrane disposed between a first electrocatalyst layer E1 and a second electrocatalyst layer E2; wherein
the first electrocatalyst layer E1, in contact with a surface of the membrane, comprises at least one discrete electrolysis-active area (ELE1$_i$) and at least one discrete energy generation-active area (EG1$_1$);
the second electrocatalyst layer E2, in contact with the surface of the membrane opposite of the surface in contact with the first electrocatalyst layer E1, comprises at least one discrete electrolysis-active area (ELE2$_i$) and at least one discrete energy generation-active area (EG2$_i$);
wherein the at least one discrete electrolysis-active area (ELE1$_i$) of said first electrocatalyst layer E1 corresponds and is aligned with the at least one discrete electrolysis-active area (ELE2$_i$) of said second electrocatalyst layer E2;
wherein the at least one discrete energy generation-active area (EG1$_i$) of said first electrocatalyst layer E1 corresponds and is aligned with the at least one discrete energy generation-active area (EG2$_i$) of said second electrocatalyst layer E2; and
wherein the assembly further comprises at least one boundary region between the at least one discrete electrolysis-active area (ELE1$_i$) and the at least one discrete energy generation-active area (EG1$_i$) of the first electrocatalyst layer E1 and at least one boundary region between the at least one discrete electrolysis-active area (ELE2$_i$) and the at least one discrete energy generation-active area (EG2$_i$) of the second electrocatalyst layer E2;
wherein each said boundary region has negligible or no electrical conductivity.

2. The assembly according to claim 1, wherein the ion conductive membrane comprises at least one discrete area corresponding and aligned with the electrolysis-active areas (ELE1$_i$ and ELE2$_i$) of said first and second electrocatalyst layers and comprises at least one discrete area corresponding and aligned with the energy generation-active areas (EG1$_i$ and EG2$_i$) of said first and second electrocatalyst layers.

3. The assembly according to claim 1, further comprising a first gas diffusion layer (GDL1) in contact with the surface of said first electrocatalyst layer not in contact with the ion conductive membrane and further comprising a second gas diffusion layer (GDL2) in contact with the surface of said second electrocatalyst layer not in contact with the ion conductive membrane.

4. The assembly according to claim 3, wherein said first gas diffusion layer (GDL1) comprises at least one discrete electrolysis-active area (GDL1$_{ELEi}$) corresponding and aligned with each of the at least one electrolysis-active areas on the first electrocatalyst layer and comprises at least one discrete energy generation-active area (GDL1$_{EGi}$) corresponding and aligned with each of the at least one energy generation-active areas on the first electrocatalyst layer.

5. The assembly according to claim 4, wherein said second gas diffusion layer (GDL2) comprises at least one discrete electrolysis-active area (GDL2$_{ELEi}$) corresponding and aligned with each of the at least one electrolysis-active areas on the second electrocatalyst layer and comprises at least one discrete energy generation-active area (GDL2$_{EGi}$) corresponding and aligned with each of the at least one energy generation-active areas on the second electrocatalyst layer.

6. The assembly according to claim 5, wherein the at least one discrete electrolysis-active area on the first and/or second gas diffusion layer is hydrophilic; and wherein the at least one discrete energy generation-active area on the first and/or second gas diffusion layer is hydrophobic.

7. The assembly according to claim 3, further comprising a first bipolar plate in contact with the first gas diffusion layer and a second bipolar plate in contact with the second gas diffusion layer, said first and second bipolar plates each optionally comprising at least one discrete energy generation-active area and at least one discrete electrolysis-active area corresponding and aligned with the electrolysis-active and energy generation-active areas of the first and second gas diffusion layers.

8. The assembly according to claim 7, further comprising at least one boundary region between the discrete energy generation-active areas and discrete electrolysis-active areas of said first and second electrocatalyst layers; or between the discrete energy generation-active areas and discrete electrolysis-active areas of said ion conductive membrane; or between the discrete energy generation-active areas and discrete electrolysis-active areas of said first and second gas diffusion layers; and/or between the discrete energy generation-active areas and discrete electrolysis-active areas of said first and second bipolar plates.

9. The assembly according to claim 8, wherein said at least one boundary region has a composition different from the composition of any of the adjacent energy generation-active areas and electrolysis-active areas.

10. The assembly according to claim 1, wherein said electrolysis-active areas ($ELE1_i$ and $ELE2_i$) on said first and second electrocatalyst layers comprise catalysts suitable for the electrolysis of water.

11. The assembly according to claim 1, wherein said energy generation-active areas ($EG1_i$ and $EG2_i$) on said first and second electrocatalyst layers comprise catalysts suitable for the production of water from hydrogen and oxygen.

12. The assembly according to claim 9, wherein the ratio between the sum of all of the discrete energy generation-active areas ($EG1_i$ or $EG2_i$) on said first or second electrocatalyst layer and the sum of all of the discrete electrolysis-active areas ($ELE1_i$ or $ELE2_i$) on said first or second electrocatalyst layer is in the range from 1.5:1 to 5:1.

13. The assembly according to claim 12, wherein said ratio is in the range from 2.8:1 to 3.5:1.

14. A fuel cell comprising the assembly of claim 1.

15. The assembly according to claim 1, wherein the boundary regions have electrical conductivity different from each of the adjacent discrete energy generation-active and discrete electrolysis-active areas.

16. The assembly according to claim 15, wherein the boundary regions have no electrical conductivity.

17. The assembly according to claim 1, wherein the boundary regions have lower electrical conductivity and lower water adsorption properties than each of the adjacent discrete energy generation-active and discrete electrolysis-active areas.

18. The assembly according to claim 1, wherein the boundary regions are discrete regions characterized by compositions different from the compositions of any of the adjacent discrete energy generation-active and discrete electrolysis-active areas.

* * * * *